Oct. 27, 1953 J. W. WEST 2,657,334

TUNABLE MAGNETRON

Filed Jan. 29, 1952 2 Sheets-Sheet 1

INVENTOR
J. W. WEST
BY [signature]
ATTORNEY

TUNABLE MAGNETRON

Filed Jan. 29, 1952 2 Sheets-Sheet 2

INVENTOR
J. W. WEST
BY [signature]
ATTORNEY

Patented Oct. 27, 1953

2,657,334

UNITED STATES PATENT OFFICE 2,657,334

TUNABLE MAGNETRON

John W. West, Allentown, Pa., assignor to Bell Telephone Laboratories, Incorporated, New York, N. Y., a corporation of New York Application January 29, 1952, Serial No. 268,784

11 Claims. (Cl. 315—40)

Figure 1:
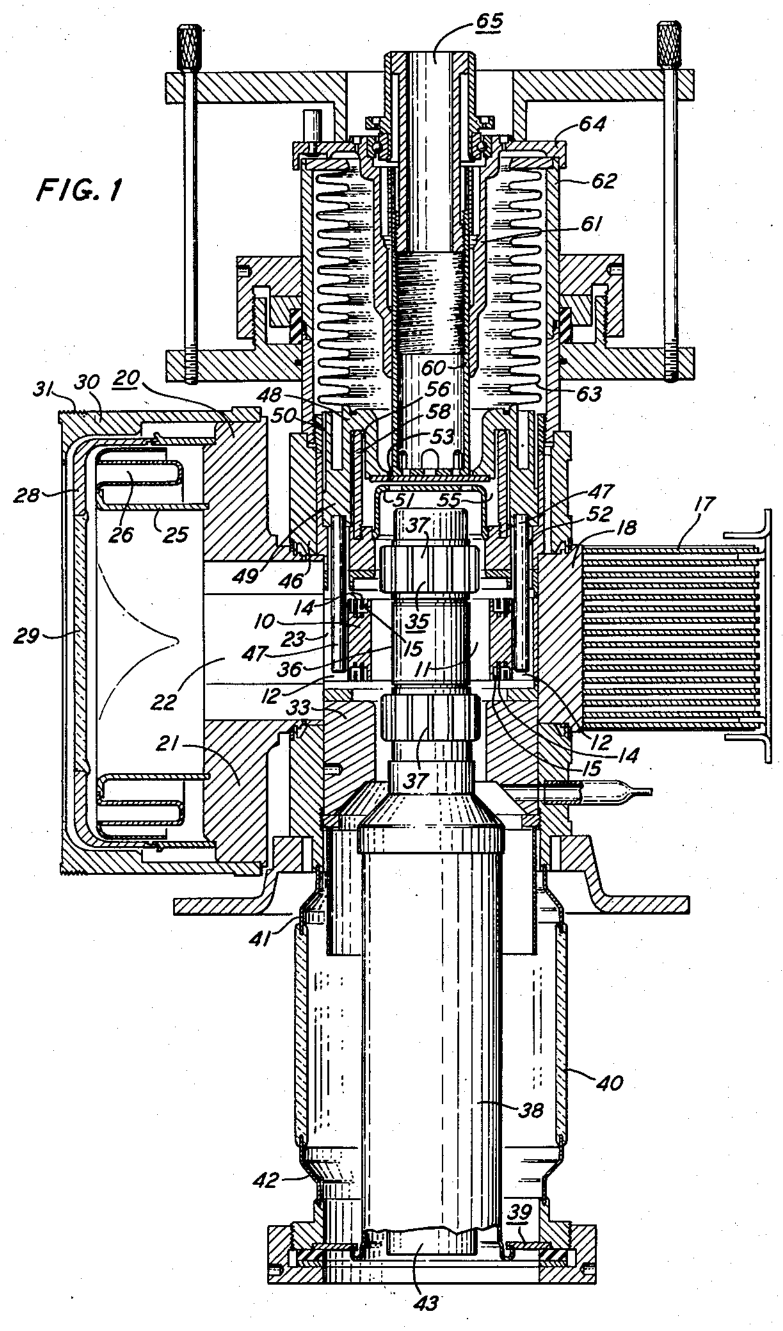

This invention relates to electron discharge devices and more particularly to tunable multicavity magnetrons.

In tunable multicavity magnetrons of the type to which this invention pertains, the anode comprises a conductive body having a central bore therethrough in which the cathode is positioned and a number of parallel bores defining the cavity resonators. These cavity resonator bores are disposed about and coupled to the center bore. Tuning is effected by the insertion of conductive members, such as pins, into each of the resonator bores to vary the inductance of the resonator with a corresponding change in the frequency of operation of the magnetron.

It has been found, however, that unwanted resonances can occur within the range of frequencies over which the magnetron may be tuned and that these unwanted resonances cause a marked degradation in the performance. Specifically, the power output may be substantially reduced, and abrupt changes in frequency may occur.

One of these unwanted resonances may occur due to the fact that the individual tuning pin being inserted into or withdrawn from the resonator bore defines with that bore a coaxial line. This coaxial line will be resonant when the tuning pin length is a quarter wavelength, or an odd multiple thereof, of the frequency of the magnetron. Another of these spurious resonances is associated with the cavity formed by the member carrying the tuning pins, the pole piece in which the tuning pin assembly is situated, and the closure cap extending over the end of the cathode. The volume of this cavity is variable as the tuning pins are moved within the resonator bores, and the cavity may resonate within the range of frequencies over which it is desired to operate the magnetron. With either kind of spurious resonance, power is absorbed by the resonant circuit causing a marked lessening in the power output of the magnetron.

Priorly, it has been proposed to short the tuning pins to the anode bores or to the pole pieces of the magnetron at a specified distance to prevent the spurious resonance resulting from the coaxial line formed by the tuning pin and the resonator bore. It has been suggested that the tuning pins be short-circuited to the anode directly adjacent the anode, as by a special resonance suppressing ring. The pins are then of such length that they are less than a quarter wavelength of the highest operating frequency, which will occur when the pins are fully inserted into the resonator bores. Withdrawal of the tuning pins will then cause a lowering of the operating frequency but a raising of the frequency of the resonant line so that there will be no cross overs within the frequency range of operation. This method, however, also requires that the length of the anode be less than a quarter wavelength of the highest frequency of the magnetron tuning range, which limitation inhibits the size and power output of the magnetron.

Application Serial No. 96,963, filed June 3, 1949, of M. S. Glass, suggests that the tuning pins be short-circuited not adjacent the anode but a quarter wavelength away from the anode at the lowest operating frequency. Then, insertion of the pins into the resonator bores will increase the operating frequency and decrease the resonant frequency of the coaxial line, so that no cross overs will occur. Manufacturing difficulty has been encountered, however, in maintaining the tolerances required by the very close spacings, and particularly in the reduced diameter bores in the tuning head pole piece through which the tuning pins pass and in which they are shorted to the pole piece.

One object of this invention is to provide an improved electron discharge device of the magnetron type wherein degradation of the operating characteristics due to spurious resonances is prevented. More specifically, it is an object of this invention to prevent the appearance of spurious resonances in magnetrons employing tuning pins axially inserted into the resonator bores either resulting from the resonance of the coaxial line defined by the tuning pin and the resonator bore or from the resonance of the variable cavity defined by the tuning pin support and the closure member extending over the cathode.

In one specific illustrative embodiment of this invention, the tuning pins are not themselves shorted to the anode or pole piece. Instead, the tuning pins are attached to a tuning pin support member that fits closely within the pole piece, and, because of the high capacitance between the tuning pin support member and the pole piece, they can be considered as being electrically shorted together. The tuning pins are themselves a half wavelength long for the frequency at the middle of the tuning range. Thus the length of the tuning pin, which is the inner conductor of the coaxial line formed by the tuning pin and the anode resonator bore and pole piece, is always about a half wavelength long. As the depth of insertion of the tuning pin into the resonator bore is varied, the support member and thus the point of short-circuiting to the pole piece move also so that the length of the coaxial line does not vary appreciably but remains about a half wavelength long. As the tuning pin is shorted at one end and open-circuited at the other, this is an antiresonant condition.

In this specific embodiment, a cylindrical metal tube is attached to the pole piece within the circumference of the circle upon which the tuning pins are located. This metal tube is positioned so as to be directly adjacent the tuning pin support member and the tuning pins attached thereto and serves as a tuning head choke to seal off the variable cavity defined by the tuning pin support and the tuning head pole piece and cathode closure cap, thereby preventing spurious resonances occurring in this cavity.

It is therefore one feature of this invention that a tuning head choke be positioned between the tuning pins and the variable cavity defined by the tuning pin support member and the cathode closure cap to prevent spurious resonances occurring in this cavity. Further, in accordance with this feature of this invention, this tuning head choke is a metallic sleeve attached to the tuning head pole piece within the circumference of the circle upon which the tuning pins are located and extending closely adjacent the tuning pin support member and tuning pins and into a groove within the tuning pin support member.

It is a further feature of this invention that the tuning head choke be employed in combination with half wavelength tuning pins to prevent spurious resonances occurring due either to resonance of the variable tuning cavity or resonance of the coaxial line defined by the tuning pins and the anode resonator and pole piece bores.

Figure 2:
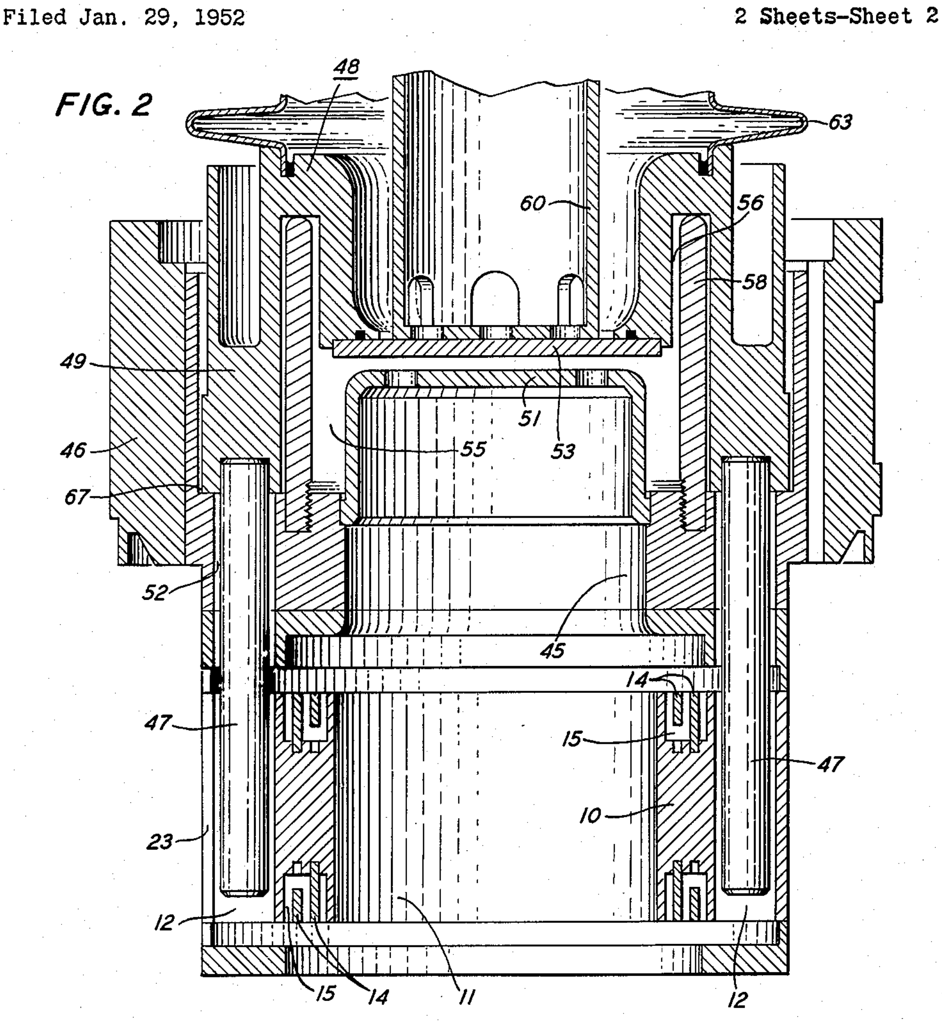
Figure 3:
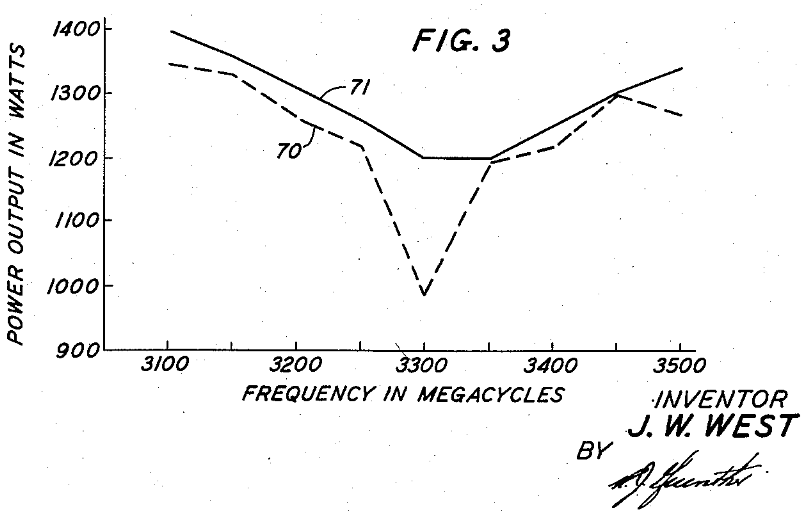

A complete understanding of this invention and of the various features thereof may be gained from consideration of the following detailed description and the accompanying drawing, in which:

Fig. 1 is a sectional view of a magnetron illustrative of one embodiment of this invention;

Fig. 2 is an enlarged detail view, mainly in section, showing particularly the tuning pins, anode, tuning pin support member, and tuning head choke member of the embodiment of this invention depicted in Fig. 1; and Fig. 3 is a curve of power output as a function of frequency for magnetrons employing tuning head choke members, in accordance with this invention, and magnetrons not employing such members, each curve being the average of data for a large number of tubes.

Referring now to the drawing, the magnetron therein illustrated comprises an anode 10 having an axial bore 11 and a plurality of cavity resonator bores 12 equally spaced in a circular array around the axial bore 11 and communicating therewith, as is known in the art. The alternate anode segments thus defined are connected by mode separation straps 14 positioned in grooves 15 at each end of the anode 10 and connected to the two sets of alternate anode segments. Heat radiating vanes 17 are supported by a metallic body member 18 connected to the anode 11 and extend substantially three-quarters around the anode 11, leaving room for a wave guide section 20 for connection to an external wave guide system. This wave guide section 20 through which the energy from the magnetron is transmitted to the external system comprises a platform 21 secured hermetically to the body member 18 and having a preferably dumb-bell shaped slot 22 wherein having its straight portion aligned with a slot 23 extending from one of the cavity resonator defining bores 12. An inner hollow metallic member 25 is axially aligned with the dumb-bell shaped slot 22 and has a channel shaped choke 26 secured at its open end away from the platform 21. An outer hollow member 28 is secured to the platform 21, encompasses the inner member 25 and has hermetically sealed thereto a window 29 transparent to the passage of microwave energy. A metallic coupling member 30 encompasses the outer member 28 and has a threaded portion 31 for connection to the external wave guide system.

A first pole piece 33 is hermetically sealed to body member 18 and platform 21, the pole piece 33 having a central aperture through which extends the cathode assembly 35. The cathode assembly comprises a cylindrical sleeve 36 positioned within the axial anode bore 11 and having an electron emissive coating thereon, magnetic collars 37 adjacent the coated sleeve portions, a heater element, not shown, within the sleeve 36 and a supporting cylinder 38 secured to an end cap 39 supported from the pole piece 33 by a vitreous cylindrical section 40 and a pair of metallic cylindrical sections 41 and 42. One terminal for the heater is provided by a cylindrical conductor 43 extending through the supporting cylinder 38 and insulated therefrom and the other terminal is provided by the cap 39 connected to the supporting cylinder 38.

A second pole piece 46 having a central aperture 45 therein axial with the central anode aperture 11 supports the tuning mechanism which includes a plurality of tuning pins 47 axially insertable through bores 52 in the pole piece 46 into the cavity resonator bores 12 and a supporting carrier or mounting member 48 to which the pins are secured. The carrier 48 has a cylindrically shaped portion 49 that slides within a center bore 50 in the pole piece 46, making electrical contact thereto, as explained further below. This center bore 50 is closed off by a cathode closure cap 51 extending over the end of the cathode sleeve 36. The center portion 53 of the supporting carrier 48 defines with the closure cap 51 and the cylindrical portion 49 of the carrier 48 a variable cavity 55. The carrier 48 has a circular groove 56 between the cylindrical portion 49 to which the pins 51 are secured and the central portion 53 adjacent the cathode closure cap and a cylindrical tuning head choke 58 positioned by the pole piece 46 extends into the groove 56, as explained further below.

The central portion 53 of the carrier 48 is mounted from an internally threaded reciprocal shaft 60 slidably positioned within an outer mounting sleeve 61 supported by a metallic cylinder 62 which in turn is hermetically sealed to the pole piece 46. A sylphon bellows 63 has one end attached to the carrier 48 and the other end hermetically sealed to a flange 64 carried by the cylinder 62. A mechanism 65 is also supported by the cylinder 62 for axial displacement of the shaft 60.

Turning now to Fig. 2, the tuning assembly for the specific embodiment of this invention depicted in Fig. 1 is there shown in enlarged detail, the tuning pins being inserted their maximum length for tuning to the highest operating frequency of the magnetron. In the operation of tuning assembly, withdrawal of the pins 47 due to operation of the mechanism 65 will cause the frequency of operation of the magnetron to decrease. However, the free length of the tuning pins will remain constant, being determined from the point 67 of electrical contact between the cylindrical outer portion 49 of the tuning pin support member or carrier 48 and the pole piece 46 to the free end of the tuning pins 47. As the pins 47 are withdrawn from the anode resonator bores 12 this point 67 is similarly moved due to the motion of the tuning pin carrier 48. The tuning pins 47 are advantageously each a half wavelength long for the median frequency of operation, the length being measured from the point 67 to the free end of the pin. Regardless of the tuning pin position its length will remain substantially a half wavelength long at the frequency of operation and as this is an antiresonant condition for a coaxial line short circuit at one end and open circuit at its other end, no spurious resonances will occur in this coaxial line defined by the pins 47 and the anode cavity resonator bores 12 and the enlarged bores 52 in the pole piece through which the tuning pins extend.

As the tuning pins are withdrawn, the central portion 53 of the tuning pin support member 48 is of course similarly withdrawn from the proximity of the cathode closure cap 51 and the volume of the cavity defined by the cathode closure cap 51 and the carrier 48 increases. As the pins are withdrawn from the bores 52 in the tuning head pole piece 46, radio frequency power will come through the bores 52 and into the space priorly occupied by the cylindrical portion 49 of the tuning pin carrier 48 and will tend to enter the variable cavity 55. When the dimensions of the cavity 55 are such that the cavity is resonant at the frequency of operation, considerable power will tend to be fed into this cavity causing a marked lessening in the available output power and possibly also causing an abrupt frequency change. However, in accordance with this invention, a tuner head choke is positioned between the axial bores 52 and the variable cavity 55 so that radio frequency power emanating from the bores 52 cannot enter the cavity 55. This choke is defined by the cylindrical tube 58 which seals off the variable cavity 55 from the radio frequency power so that even when the resonant frequency of the cavity and the frequency of operation cross there will be no degradation in the performance of the magnetron. The cylindrical choke 58, as clearly seen in Fig. 2, is supported by the pole piece 46, as by being threadedly engaged thereto, and extends along the inside of the cylindrical portion 49 of the tuner pin carrier 48 and into a cylindrical groove 56 in the carrier 48. The outside of the choke 58 and the inside of the cylindrical portion 49 are so closely spaced that they are electrically shorted together at the frequencies of operation of the magnetron, thereby effectively sealing off the cavity 55. The length of the cylindrical choke is slightly longer than the total travel of the tuning pins 47 required to effect the desired tuning range for the magnetron.

Referring now to Fig. 3, power output as a function of frequency is there plotted for magnetrons employing a tuning head choke member in accordance with this invention and for magnetrons not employing such a choke member. Curve 70 is an average plot of the results of tests on fifty-seven tubes without a tuning head choke member and, as is readily apparent, a marked power dip occurs at approximately 3300 megacycles. Since the power frequency curve is an average one it does not show the extent of the power dips which occurred in a number of tubes, the power dropping to as little as 300 watts and the magnetron virtually dropping out of oscillation. Curve 71 is a plot of the power frequency characteristic for magnetrons in accordance with the specific embodiment of Fig. 1 employing a tuning head choke member 58. As can be seen, power loss due to resonance in the variable cavity is prevented by the tuning choke member 58 and as power loss due to resonance in the tuning pin coaxial line is prevented by having the tuning pin a half wavelength at the median frequency of the tuning range of the magnetron, no spurious resonances occur within the tuning range of the magnetron.

It is to be understood that the above-described arrangements are illustrative of the application of the principles of the invention. Numerous other arrangements may be devised by those skilled in the art without departing from the spirit and scope of the invention.

What is claimed is:

1. A multicavity resonator comprising an anode having a central aperture therein and a plurality of cavity resonator bores disposed about said central aperture and communicating therewith, a pole piece adjacent said anode having an aperture therein axial with said central anode aperture, closure means across said pole piece aperture, a plurality of tuner pins each axially movable in one of said resonator bores, means for moving said pins to vary the extent of insertion in said bores thereby to tune said resonators over a preassigned range of frequencies, said moving means including a tuner pin support member having a portion adjacent said closure means and defining therewith boundaries of a variable cavity, and choke means preventing leakage of radio frequency power into said variable cavity, said choke means comprising a conducting member closely adjacent said tuner pin support member and producing a radio frequency short between said support member and said conducting member at all positions of said pins.

2. A multicavity resonator comprising an anode having a central aperture therein and a plurality of cavity resonator bores disposed about parallel to and communicating with said central aperture, a pair of pole pieces adjacent said anode on opposite sides thereof, one of said pole pieces having an aperture therein axial with said central anode aperture, a closure member across said pole piece aperture, a plurality of tuner pins each axially movable in one of said resonator bores, means for moving said pins to vary the extent of insertion of said pins in said bores thereby to tune said resonators over a preassigned range of frequencies, said moving means including a tuner pin carrier having a portion adjacent said closure member and defining therewith boundaries of a variable cavity, and a cylindrical choke member closely adjacent said tuner pin carrier to produce a radio frequency short between said carrier member and said cylindrical choke member at all positions of said pins to prevent leakage of radio frequency power into said variable cavity.

3. A multicavity resonator comprising an anode having a central aperture therein and a plurality of cavity resonator bores disposed about parallel to and communicating with said central aperture, a pair of pole pieces adjacent said anode and to opposite sides thereof, one of said pole pieces having an aperture therein axial with said central anode aperture, a closure cap across said pole piece aperture, a plurality of tuner pins each axially movable in one of said resonator bores, means for moving said pins to vary the extent of insertion of said pins in said bores to tune said cavity resonators over a prescribed range of frequencies, said means including a tuner pin support member having a cylindrical portion to which said tuner pins are secured and a central portion adjacent said closure cap and defining therewith boundaries of a variable cavity, and a cylindrical choke member closely adjacent said cylindrical portion of said tuner pin support member to produce a radio frequency short between said cylindrical choke member and said cylindrical portion of said tuner pin support member at all positions of said pins to prevent leakage of radio frequency power into said variable cavity, the length of said cylindrical choke member being at least equal to the length of travel of said tuner pins in said anode resonator bores.

4. A multicavity resonator in accordance with claim 3 wherein said cylindrical portion of said tuner pin support member is closely adjacent said one pole piece adjacent the supported ends of said tuner pins to produce a radio frequency short between said supported ends and said one pole piece.

5. A multicavity resonator in accordance with claim 4 wherein the length of said tuner pins is substantially one-half the wavelength for the median frequency of said prescribed range of frequencies.

6. A magnetron comprising an anode having therein a central aperture and a plurality of cavity resonator bores disposed about parallel to and communicating with said central aperture, a cathode in said central aperture, a pair of pole pieces opposite the ends of said cathode, one of said pole pieces having a central aperture therein axial with said central anode aperture, a cathode closure cap extending across said pole piece central aperture, a plurality of tuner pins each axially movable in one of said resonator bores, means for moving said pins to vary the extent of insertion of said pins in said bores, said moving means including a tuner pin carrier to which said pins are secured and having a portion adjacent said closure cap and defining therewith boundaries of a variable cavity, and choke means preventing leakage of radio frequency power into said variable cavity, said choke means comprising a conducting member encircling said cavity and electrically connected at said radio frequencies to said carrier and to said closure cap.

7. A magnetron comprising an anode having therein a central aperture and a plurality of cavity resonator bores disposed about parallel to and communicating with said central aperture, a cathode in said central aperture, a pair of pole pieces opposite the ends of said cathode, one of said pole pieces having a central aperture therein axial with said central anode aperture, a cathode closure cap extending across said pole piece central aperture, a plurality of tuner pins each axially movable in one of said resonator bores, means for moving said pins to vary the extent of insertion of said pins in said bores to tune said cavity resonator over a prescribed range of frequencies, said moving means including a tuner pin carrier to which said tuner pins are secured and having a portion adjacent said closure cap and defining therewith boundaries of a variable cavity, and choke means preventing the leakage of radio frequency power from around said tuner pins into said variable cavity, said choke means comprising a cylindrical choke member closely adjacent said tuner pin carrier to produce a radio frequency short between said carrier and said cylindrical choke member at all positions of said pins.

8. A magnetron comprising an anode having therein a central aperture and a plurality of cavity resonator bores disposed about parallel to and communicating with said central bore, a cathode in said central aperture, a pole piece opposite one end of said cathode having a central aperture therein axial with said central anode aperture, a cathode closure cap extending across said pole piece aperture adjacent said one end of said cathode, a plurality of tuner pins each axially movable in one of said resonator bores, means for moving said pins to vary the extent of insertion of said pins in said bores to tune said cavity resonator over a prescribed range of frequencies, said means including a tuner pin support member having a cylindrical portion to which said tuner pins are secured, a central portion adjacent said closure cap and defining therewith the boundaries of a variable cavity, and a cylindrical groove therein at the base of said cylindrical portion, and a cylindrical choke member closely adjacent said cylindrical portion of said tuner pin support member to produce a radio frequency short between said cylindrical choke member and said cylindrical portion of said tuner support member at all positions of said pins to prevent leakage of radio frequency power into said variable cavity, said cylindrical choke member extending into said cylindrical grooves when said tuner pins are fully inserted into said resonator bores.

9. A magnetron in accordance with claim 8 wherein the length of said cylindrical choke member is at least equal to the length of travel of said tuner pins in said anode resonator bores and the cylindrical portion of said tuner pin support member is closely adjacent said pole piece adjacent the supported ends of said tuner pins to produce a radio frequency short between said supported ends and said pole piece.

10. A magnetron comprising an anode having therein a central bore and a plurality of cavity resonator bores disposed about parallel to and communicating with said central bore, a cathode in said central bore, a pole piece opposite one end of said cathode having a central aperture therein axial with said central anode aperture, a cathode closure cap extending across said pole piece aperture adjacent said one end of said cathode, a plurality of tuner pins each axially movable in one of said resonator bores, means for moving said pins to vary the extent of insertion of said pins in said bores to tune said resonators over a prescribed range of frequencies, the length of said pins being substantially one-half the wavelength for the median frequency of said prescribed range of frequencies, said moving means including a tuner pin support member having a cylindrical portion to which said pins are secured, said cylindrical portion being closely adjacent said pole piece adjacent the supported ends of said pins to produce a radio frequency short between said supported ends and said pole piece, and a central portion adjacent said closure cap and defining therewith boundaries of a variable cavity, and a conducting choke member encircling said cavity to prevent leakage of radio frequency power therein, said choke member being electrically connected at said range of frequencies to said pole piece and said support member.

11. A magnetron comprising an anode having therein a central bore and a plurality of cavity resonator bores disposed about parallel to and communicating with said central bore, a cathode in said central bore, a pole piece opposite one end of said cathode having a central aperture therein axial with said central anode aperture, a cathode closure cap extending across said pole piece aperture adjacent said one end of said cathode, a plurality of tuner pins each axially movable in one of said resonator bores, means for moving said pins to vary the extent of insertion of said pins in said bores to tune said resonators over a prescribed range of frequencies, the length of said pins being substantially one-half the wavelength for the median frequency of said prescribed range of frequencies, said moving means including a tuner pin support member having a cylindrical portion to which said tuner pins are secured, said cylindrical portion being closely adjacent said pole piece adjacent the supported ends of said tuner pins to produce a radio frequency short between said supported ends and said pole piece, a central portion adjacent said closure cap and defining therewith boundaries of a variable cavity, and a cylindrical groove therein at the base of said cylindrical portion, and a cylindrical choke member closely adjacent said cylindrical portion of said tuner pin support member to produce a radio frequency short between said cylindrical choke member and said cylindrical portion of said tuner support emmber at all positions of said pins to prevent leakage of radio frequency power into said variable cavity, said cylindrical choke member extending into said cylindrical groove when said tuner pins are fully inserted into said resonator bores and the length of said choke member being at least equal to the length of travel of said tuner pins in said anode resonator bores.

JOHN W. WEST.

No references cited.